ary Examiner—S. Leon Bashore
United States Patent [19]
Adams et al.

[11] 3,839,001
[45] Oct. 1, 1974

[54] MANUFACTURE OF CERAMIC ARTICLE

[75] Inventors: Edward F. Adams, Corning; Edward A. Bush, Painted Post; Thomas G. Clayton, Lodi; David G. Grossman, Corning; Paul B. Ohliger, Elmira, all of N.Y.

[73] Assignee: Corning Glass Works, Corning, N.Y.

[22] Filed: July 20, 1973

[21] Appl. No.: 381,355

[52] U.S. Cl. .................... 65/33, 65/18, 106/39.7, 106/39.8
[51] Int. Cl. .................... C03b 29/00, B28b 7/28
[58] Field of Search ............... 106/39.6, 39.7, 39.8; 65/18, 33

[56] References Cited
UNITED STATES PATENTS

| | | | |
|---|---|---|---|
| 3,096,159 | 7/1963 | Van Cutt | 65/33 X |
| 3,246,972 | 4/1966 | Smith | 65/18 |
| 3,462,252 | 8/1969 | Veres | 65/18 |
| 3,634,111 | 1/1972 | Campbell | 65/33 X |
| 3,713,854 | 1/1973 | Beal | 106/39.7 |
| 3,775,164 | 11/1973 | Smith et al. | 65/33 |
| 3,778,242 | 12/1973 | Francel et al. | 106/39.6 |

*Primary Examiner*—S. Leon Bashore
*Assistant Examiner*—F. W. Miga
*Attorney, Agent, or Firm*—Richard N. Wardell; Clarence R. Patty, Jr.

[57] ABSTRACT

Differing linear thermal expansions at elevated temperature and thermal expansion hysteresis of crystalline ceramic articles made from the same finely divided, $Li_2O$-$Al_2O_3$-$SiO_2$ glass frit that crystallizes in situ during sintering are avoided or minimized by, prior to shaping and firing the frit, mixing the frit together with about 0.01–3.5 percent by weight (based on the combined weight of the resultant mixture) of −325 Tyler mesh particulate crystalline seeding material selected from beta-spodumene solid solution, beta-spodumene, alpha-spodumene, petalite, titania, zirconia, zircon, silicon and mixtures thereof.

10 Claims, No Drawings

MANUFACTURE OF CERAMIC ARTICLE

BACKGROUND OF THE INVENTION

U.S. Pat. No. 3,600,204 discloses a $Li_2O$-$Al_2O_3$-$SiO_2$ glass frit that was developed for shaping and firing into crystalline ceramic (or glass-ceramic) articles having very low average thermal expansion by virtue of the beta-spodumene solid solution crystals therein and having excellent dimensional stability for long periods of time at temperatures up to 900°C. Such frit has been particularly and advantageously employed in the manufacture of the several parts of composite regenerative heat exchanger bodies as described in U.S. Pat. Nos. 3,112,184 and 3,251,403 wherein the several ceramic parts must have closely the same thermal expansion characteristics in order for such bodies to withstand the service conditions of continuously fluctuating temperature without cracking and destruction resulting therefrom. Generally, the glass frit has been employed as the only ceramic-forming component of the batches for manufacturing articles. However, U.S. Pat. No. 3,600,204 notes that, for similar results, such batches may also be mixtures of the glass frit and previously-crystallized material, such as is disclosed in U.S. Pat. No. 3,246,972.

However, during the past several years, crystalline ceramic articles produced in the same manner from large commercial size batches of the above-noted frit of the same analytical oxide composition were found to have the chronic problems of linear thermal expansion differing substantially between such articles and of some of the articles suffering from a thermal expansion pattern (or curve) during heating being substantially different than the thermal contraction pattern (or curve) during cooling of the same article (i.e., thermal expansion hysteresis) while others did not so suffer. These inconsistent and unpredictable property variations of those articles have made it very difficult to produce satisfactory commercial products (e.g., the composite ceramic regenerative heat exchangers) in desired quantities without a large scrap loss due to product failure under varying thermal conditions of service. The absence in the prior art of any disclosed or evident remedy to these problems and the need for such remedy prompted considerable experimentation to find one. That experimentation resulted in the discovery of the present invention, which provides the needed remedy.

SUMMARY OF THE INVENTION

We have discovered that the widely varying, inconsistent and unpredictable thermal expansion characteristics of articles made from the same glass frit and in the same manner, as noted above, can be avoided or minimized by "seeding" of the glass frit with certain particulate crystalline material. By "seeding" we mean mixing such particulate material with the glass frit prior to forming or shaping it into green (i.e., unfired) articles that are subsequently fired. Thus, our invention consistently provides substantially similar linear thermal expansion between articles made from the same glass frit and in the same manner, and it also consistently provides such articles with very little or no thermal expansion hysteresis.

Accordingly, our invention is an improvement in the method of making crystalline ceramic articles from finely divided glass frit consisting essentially (by weight on an oxide basis) of about 3.5–7.5 percent $Li_2O$, 15–30 percent $Al_2O_3$ and 65–80 percent $SiO_2$, with the mole ratio $Al_2O_3$:$Li_2O$ being between about 1.0–1.5 and the sum of $Li_2O$, $Al_2O_3$ and $SiO_2$ constituting at least 98 percent by weight of the total composition of the frit. Such method, as known heretofore, comprises: (a) shaping or molding the frit into a green article and (b) firing the green article at about 900°–1350°C. for a time (usually 1–24 hours) sufficient to sinter the frit to a coherent article and to cause the glass to crystallize in situ. Our improvement comprises mixing together, prior to the shaping step, the frit and about 0.01–3.5 percent (advantageously about 0.05–1 percent) by weight (based on the combined weight of the resultant mixture) of −325 Tyler mesh (44 microns) particulate crystalline seeding material selected from beta-spodumene solid solution, beta-spodumene, alpha-spodumene, petalite, titania, zirconia, zircon, silicon and mixtures thereof. While 0.01 wt. percent seeding material is approximately the least amount to significantly provide the desired remedial effect, 3.5 wt. percent of such material is the maximum for avoiding undesirable open porosity in the fired articles. The range of 0.05–1 wt. percent seeding material gives better assurance of remedial effect and minimized undesirable open porosity. For the greatest remedial effect from a given weight of seeding material, such material should have an average particle size less than ten microns (preferably eight microns). On that basis, we have found that 0.1–0.5 percent by weight (based on the total frit-seeding material mixture weight) of seeding material gives very effective remedial results and that amounts above 0.5 percent by weight generally do not provide any greater effect.

DESCRIPTION OF THE PREFERRED EMBODIMENTS

Illustrative procedures for preparing the glass frit, and shaping and firing it to sintered crystalline ceramic (or glass-ceramic) articles are described in U.S. Pat. No. 3,600,204 and in the two patents specifically referred to therein (which are incorporated herein by reference). However, other shapes and types of formed articles can be made from the frit and seeding material mixture as desired. Also, other appropriate conventional or suitable ceramic shaping or fabrication procedures (e.g., dry or plastic pressing, extrusion, injection molding, isostatic pressing, slip casting, etc.) can be employed as desired.

By way of typical illustration of this invention with respect to the entire described range of glass frit composition, the following examples are given with the glass frit therein being −325 Tyler mesh and having a typical analysis (by weight of 72 percent $SiO_2$, 23 percent $Al_2O_3$ and 5 percent $Li_2O$.

Table 1 sets forth data from examples of honeycomb structures or matrix bodies made as described in U.S. Pat. No. 3,600,204 (except for the firing schedule) without seeding material included therein.

The firing schedule employed was as follows:
Room temperature to 720°C. at 300°C./hour
Hold 3.5 hours at 720°C.
720°C. to 810°C. at 180°C./hour
Hold 2.75 hours at 810°C.
810°C. to 860°C. at 15°C./hour
860°C. to 940°C. at 12°C./hour 940°C. to 1025°C. at 24°C./hour
1025°C. to 1310°C. at 70°C./hour
Hold 10 hours at 1310°C.
1310°C. to 1000°C. at 50°C./hour
1000°C. to 800°C. at 100°C./hour
800°C. to room temperature at closed furnace rate.

The thermal expansion data were determined by conventional procedures from samples 2 inches × ¼ inch × ¼ inch cut from a large honeycomb matrix. Such data illustrates the wide variability of linear thermal expansion (illustratively at 800°C.) and the substantial hysteresis occurring in the absence of "seeding" according to our invention.

TABLE 1

| Sample | Linear Expansion at 800°C. (cooling 800°C.-room temp.) parts per million | Thermal Expansion Hysteresis relative amount |
|---|---|---|
| 1 | 300 | None |
| 2 | 310 | None |
| 3 | 305 | None |
| 4 | 325 | None |
| 5 | 330 | None |
| 6 | −295 | Moderately large |
| 7 | −130 | Moderately large |
| 8 | −495 | Moderately large |
| 9 | −320 | Moderately large |
| 10 | −190 | Moderately large |
| 11 | −535 | Large |
| 12 | −665 | Large |
| 13 | −260 | Large |
| 14 | 75 | Moderate |
| 15 | −245 | Moderate |

Table 2 sets forth data from examples of honeycomb matrix bodies made in the same way as those referred to in Table 1, except that seeding material was mixed with the glass frit. The seeding material was beta-spodumene solid solution made by crystallizing some of the glass frit at 1310°C. Such material had a typical average particle size of 8.0 microns. These bodies are characterized by very little or no thermal expansion hysteresis. The linear thermal expansion data illustrates the consistency and predictability in thermal expansion characteristics that is made possible by "seeding" in accordance with our invention.

TABLE 2

| Sample | Seeding Material wt. % | Linear Expansion at 800°C. (cooling 800°C.-room temp.) parts per million |
|---|---|---|
| 16 | 0.50 | 355 |
| 17 | 0.75 | 350 |
| 18 | 0.25 | 295 |
| 19 | 1.50 | 310 |
| 20 | 0.50 | 320 |
| 21 | 0.25 | 300 |
| 22 | 1.00 | 295 |
| 23 | 0.50 | 265 |
| 24 | 0.25 | 265 |
| 25 | 0.25 | 360 |
| 26 | 0.25 | 330 |
| 27 | 0.25 | 340 |
| 28 | 0.50 | 285 |
| 29 | 0.50 | 340 |
| 30 | 0.12 | 270 |
| 31 | 0.12 | 250 |
| 32 | 0.25 | 255 |
| 33 | 0.25 | 305 |
| 34 | 0.25 | 310 |

In order to demonstrate the effectiveness of other seeding materials to correct or raise the erratically low linear thermal expansion values of the above-described frit, a portion of the frit determined to yield such low values was selected for making experimental samples from which typical consistent and predictable thermal expansion data are shown in Table 3. These samples were made by thoroughly mixing the frit (with and without 0.2 wt. percent seeding material of 1–9 microns average particle size) with four parts by weight of polyethylene glycol binder for each 100 parts by weight of frit or frit plus 0.2 wt. percent seeding material while slurried in trichloroethane. After evaporating the trichloroethane therefrom, the resultant batches were granulated and pressed in steel molds at about 5000 psi to form green bars 4 inches × ½ inch × ½ inch. These green bars were then fired according to the following firing schedule:

Room temperature to 670°C. at 300°C./hour
Hold 2 hours at 670°C.
670°C. to 750°C. at 100°C./hour
Hold 2 hours at 750°C.
750°C. to 1000°C. at 15°C./hour
1000°C. to 1310°C. at 45°C./hour
Hold 5 hours at 1310°C.
Cool to room temperature at 200°C./hour or less.

The resultant sintered and crystallized bars were then cut to a size of 2 inches × ¼ inch × ¼ inch and conventionally tested for thermal expansion characteristics. These bars exhibit little or no hysteresis.

TABLE 3

| Sample | Seeding Material | Expansion at 800°f (ppm) |
|---|---|---|
| A | None | −500 |
| B | Petalite | −45 |
| C | Silicon | 210 |
| D | Zircon | 265 |
| E | Acid-leached crystallized frit | 282 |
| F | Alpha-spodumene | 290 |
| G | Calcined petalite (β-spod. s.s.) | 290 |
| H | Zirconia | 312 |
| I | Crystallized frit (β-spod. s.s.) | 320 |
| J | Material of E refired at 1000°C. | 325 |
| K | Calcined α-spodumene (β-spod. s.s.) | 332 |
| L | Titania | 370 |

Calcined alpha-spodumene was found to be an especially useful seeding material since it enables substantially complete crystallization of the glass frit while firing at relatively low sintering temperatures. Thus, a 0.2 wt. percent concentration of calcined alpha-spodumene in pressed bars made as noted before but fired only to 900°C. for 5 hours exhibit high beta-spodumene crystallization and consistently good thermal expansion characteristics. Similarly good results are obtained in honeycomb matrices made in a manner as noted before but with a 0.15 wt. percent concentration of calcined alpha-spodumene and fired only to 1000°C.

It will be appreciated that the seeding material can be provided in any suitable manner. An example of an alternative manner is to ball mill the glass frit with balls or milling media that are of seeding material composition, e.g., zirconia or zircon.

We claim:
1. In a method of making a crystalline ceramic article from finely divided glass frit consisting essentially (by weight on an oxide basis) of about 3.5–7.5 percent $Li_2O$, 15–30 percent $Al_2O_3$ and 65–80 percent $SiO_2$, with the mole ratio $Al_2O_3:Li_2O$ being between about

1.0–1.5 and the sum of $Li_2O$, $Al_2O_3$ and $SiO_2$ constituting at least 98% by weight of the total composition of the frit, which method comprises:

a. shaping the frit into a green article, and b. firing the green article at about 900°–1350°C. for a time sufficient to sinter the frit to a coherent article and to cause the glass to crystallize in situ;

wherein the improvement comprises:

c. mixing together, prior to said shaping, the frit and about 0.01–3.5 percent by weight (based on the combined weight of the resultant mixture) of –325 Tyler mesh particulate crystalline seeding material selected from beta-spodumene solid solution, beta-spodumene, alpha-spodumene, petalite, titania, zirconia, zircon, silicon and mixtures thereof.

2. The method of claim 1 wherein the amount of said seeding material is about 0.05–1 percent by weight (based on the combined weight of frit and seeding material).

3. The method of claim 1 wherein said seeding material has an average particle size less than ten microns.

4. The method of claim 3 wherein the amount of said seeding material is about 0.1–0.5 percent by weight (based on the combined weight of frit and seeding material).

5. The method of claim 4 wherein said seeding material is beta-spodumene solid solution.

6. The method of claim 1 wherein said frit is –200 Tyler mesh.

7. The method of claim 1 wherein said frit is –325 Tyler mesh.

8. The method of claim 1 wherein the firing time is about 1–24 hours.

9. The method of claim 1 wherein the firing temperature is at least 1000°C.

10. The method of claim 1 wherein said frit contains 4–6 percent $Li_2O$, 22–24 percent $Al_2O_3$ and 70–74 percent $SiO_2$.

* * * * *